United States Patent [19]

Ko et al

[11] Patent Number: 4,944,998

[45] Date of Patent: Jul. 31, 1990

[54] CHARGE DISSIPATIVE FLOOR TILES

[75] Inventors: Kenneth K. Ko, West Grove; Jesse D. Miller Jr., Lancaster; Wayne R. Shelly, Lancaster; Susan M. Von Stetten, Landisville, all of Pa.

[73] Assignee: Armstrong World Industries, Inc., Lancaster, Pa.

[21] Appl. No.: 301,595

[22] Filed: Jan. 26, 1989

Related U.S. Application Data

[63] Continuation-in-part of Ser. No. 78,899, Jul. 29, 1987, Pat. No. 4,826,912.

[51] Int. Cl.$^5$ .......................... C08L 27/06; B32B 5/16
[52] U.S. Cl. .................................... 428/327; 428/402; 428/357; 524/567; 524/569; 524/910; 524/911; 524/912; 524/913; 524/914
[58] Field of Search .............. 524/910, 911, 912, 913, 524/914, 569, 567; 428/327, 402, 357; 264/DIG. 31; 260/998.15

[56] References Cited

U.S. PATENT DOCUMENTS

| | | | |
|---|---|---|---|
| 2,729,770 | 1/1956 | Robbins | 317/2 |
| 3,117,113 | 1/1964 | Tudor | 260/92.8 |
| 3,382,198 | 5/1968 | Elslager | 260/23 |
| 3,404,138 | 10/1968 | Adams | 260/92.8 |
| 3,904,579 | 9/1975 | Braddicks | 260/42.46 |

*Primary Examiner*—Lewis T. Jacobs

[57] ABSTRACT

A surface covering product having static dissipative electrical properties comprises a consolidated agglomeration of individual chips of polymeric material and wherein at least a portion of said individual chips contain an antistatic agent. A second portion of individual chips contain no antistatic agent or a reduced amount of antistatic agent.

13 Claims, No Drawings

CHARGE DISSIPATIVE FLOOR TILES

CROSS REFERENCE TO RELATED APPLICATION

This application is a continuation-in-part of U.S. application Ser. No. 078,899 filed July 29, 1987, now U.S. Pat. No. 4,826,912, issued May 2, 1989, in the names of Kenneth K. Ko, et al. and entitled "Charge Dissipative Floor Tiles".

FIELD OF THE INVENTION

The present invention relates to surface covering products. In particular, the present invention relates to surface covering products having static dissipative electrical properties.

BACKGROUND OF THE INVENTION

Static control problems have been recognized and routinely addressed for years in the electronic manufacturing industries. As the miniaturization of electrical equipment progresses and the growth of the electronic industry continues, static control problems have become more and more a subject of serious concern to the electronics industry. To put the problem into perspective, it is known that someone walking across a carpeted floor can accumulate more than 30,000 volts of static charge. While published literature has referred to 25 to 100 volts as critical static discharges which could cause immediate and catastrophic damage to a sensitive electronic chip. This demonstrates the need for protecting the areas and environments where sophisticated electronics equipment are manufactured and stored.

It has been generally recognized that the prevention of static discharge requires that the total manufacturing and storage environment be constructed of materials which are capable of dissipating static charges, and that these materials be connected to a common ground. In such an environment, it is critically important that the flooring structure be protected against electrostatic discharge.

It has long been known that polymeric materials, of the kinds typically employed in flooring structures, such as polyvinyl chloride, are normally insulative. They can be made conductive, however, by incorporating either a conductive filler or an antistatic agent in the polymer structure or by employing both methods at the same time. When conductive fillers, such as metallic materials or carbon blacks, are used, the filler concentrations required to impart conductivity to the polymer structure are usually relatively high, typically thirty to fifty percent by Volume. At such concentrations, the appearance of the polymeric structure is usually black, gray, or brown, depending upon the materials employed, and are not suitable for highly decorative floor tile applications.

To protect a floor structure from accumulating dirt and to improve the lustre or glossiness of a floor structure, a floor polish is often used as a maintenance aid. For most commercial conductive floor tiles or sheet materials, especially those made with carbon and other metallic materials, i.e., commercially available carbon veined tiles and the like, such maintenance aids are not recommended by the manufacturers. This is because most commercially available floor polish materials are insulative. They will interfere with the conducting path formed by the carbon particles, or other metallic materials therein, affecting the ability of the conductive flooring structure to dissipate static charges.

For similar reasons, even a conductive floor polish is often not recommended for use in the maintenance of conductive floors, such as those employing carbon-veined tiles. This is typical because the conductive floor polish is not usually as conductive as the conductive floor itself. In addition, the residual polish worn away by traffic also interferes with the conducting path, further decreasing the charge dissipative efficiency of the conductive floor structure.

Antistatic agents, such as those containing quaternary ammonium salt functionalities have been known to impart charge dissipative properties to flooring structures in the past. However, these antistatic materials are sensitive to moisture and, in previous uses, have effected the manufacturing processing characteristics and performance characteristics of the flooring structures in which they were employed. For example, a floor structure containing moisture absorptive materials might swell or grow in length where water is present. If the moisture growth is high, the floor structure might curl or buckle, causing what is commonly referred to as a peak-seam in an installed floor structure. High moisture growth is, therefore, generally considered to be a high risk with respect to the performance of floor coverings, particularly when installed on on-grade or below-grade concrete sub-floors.

OBJECTS OF THE INVENTION

It is an object of the present invention to provide a surface covering product having static dissipative electrical properties suitable for highly decorative floor tile applications.

It is a further object of the present invention to provide a surface covering product having static dissipative electrical properties which can be maintained with commonly available commercial floor care products.

It is a still further object of the present invention to provide a surface covering product having static dissipative electrical properties without the moisture growth problems typical of antistatic agents.

According to the present invention, there is provided a surface covering product having static dissipative electrical properties, which surface covering product comprises a consolidated agglomeration of individual chips of polymeric material and wherein at least a portion of said individual chips contain an antistatic agent. In one preferred embodiment, a first portion of the individual chips contains a substantial amount of an antistatic agent and a second portion contains substantially less antistatic agent.

DETAILED DESCRIPTION OF THE PRESENT INVENTION

By far, the predominant form of resilient flooring used today is of the vinyl type. That is, flooring which has a binder system based on polyvinyl chloride, commonly referred to as PVC. This polymer by itself is a very hard, tough, virtually intractable, thermoplastic material that must be compounded with various additives to produce economically useful products. It is one of the most adaptable polymeric materials and is used for applications as widely divergent as rigid pipe to almost jelly-like fishing lures. Because of this adaptability it is well suited to the manufacture of both flexible and semi-rigid flooring materials.

Polyvinyl chloride's high molecular weight and chemical and physical nature allow it to accommodate relatively large amounts of inert filler and it can be plasticized effectively and permanently to create materials with a wide range of flexibilities. Polyvinyl chloride is inherently resistant to acids, alkali and many organic solvents. It does not hydrolyse even when in continuous contact with moisture. Because of its chlorine content, the polymer is also inherently fire resistant and as a plastic material is generally classified as self-extinguishing. Plasticized material is less fire resistant than rigid PVC, but can usually be formulated for use as a floor covering to pass the flame spread and smoke generation limitations of most building codes.

When properly compounded and processed, PVC can be a clear, colorless material or pigmented to produce the full range of colors in transparent or opaque forms.

Polymeric material, as used throughout this specification, is intended to include polyvinyl chloride in its various forms. The vinyl resins used in flooring may be homopolymers, i.e., polymers consisting of only vinyl chloride units, or copolymers, consisting of vinyl chloride and other structural units, such as vinyl acetate. The molecular weights of these resins typically range from about 40,000 to about 200,000 atomic mass units. The higher molecular weight polymers have greater ultimate tensile strength and abrasion resistance and are generally used in flooring wear layers, while the lower molecular weight polymers are most useful in producing foams for cushioned flooring. As a general rule, vinyl homopolymers are typically used in vinyl sheet goods and Type III solid vinyl tile, while Type IV vinyl composition tiles typically contain copolymers of vinyl chloride and vinyl acetate.

To protect the polymeric material from degradation during processing and during its use as flooring material, vinyl compounds must be stabilized against the effects of heat and ultraviolet radiation. The most common stabilizers used in flooring are soaps of barium, calcium and zinc; organo-tin compounds; epoxidized soy bean oils and tallate esters; and organic phosphites.

Polymeric materials for flooring uses, even for use in relatively rigid Type IV vinyl composition tiles, contain plasticizers to provide flexibility and to facilitate processing. The most frequently used plasticizer is dioctyl phthalate (DOP). Others that may be found in flooring use include butylbenzyl phthalate (BBP), alkylaryl phosphates, other phthalate esters of both aliphatic and aromatic alochols, chlorinated hydrocarbons, and various other high boiling esters. The selection of the proper type and amount of plasticizer is often critical in the formulation of flooring compounds because of the interaction of flexibility requirements, resistance to staining, reaction with maintenance finishes, and processing requirements.

In most tile and sheet flooring, the stabilized and plasticized vinyl formulation is mixed with varying amounts of inorganic filler to provide mass and thickness at a reasonable cost. The most common filler typically found in flooring is crushed limestone (calcium carbonate). Others that may be employed include talcs, clays and feldspars. In addition to providing bulk at reasonable cost, the use of inorganic fillers in flooring structures provides increased dimensional stability, resistance to cigarette burns, improved flame spread ratings and reduced smoke generation.

Pigments are used in flooring products to provide both opacity and color to the finished products. The typically preferred white pigment is titanium dioxide and colored pigments are preferably inorganic. Certain colors only available as lakes, such as the phthalocyanine blues and greens, must be resistant to the effects of alkali and light fading.

Finally, in order to pass certain code requirements with regard to fire and smoke properties various additives may be employed to reduce flame spread and smoke generation ratings. These compounds include alumina trihydrate, antimony trioxide, phosphate or chlorinated hydrocarbon plasticizers, zinc oxide, and boron compounds. Cushioned flooring containing chemically expanded foam is usually compounded with azobisformamide blowing agents. Various other processing aids and lubricants may also be employed.

Probably the most widely used resilient flooring product is vinyl composition tile, as described by Federal Specification SS-T-312b, Type IV, Composition I. While the present invention is intended for use in such tile, as the specification and Examples describe, it will be obvious to one skilled in the art that the principles will also be applicable to various other types of flooring, particularly sheet flooring formed from stencil lay-ups or fused particles.

A typical formulation for vinyl composition tile is:

|  | Percent by Weight |
| --- | --- |
| Vinyl Resin | 12.5 |
| Hydrocarbon Resin | 2.5 |
| Plasticizer | 4.0 |
| Stabilizer | 1.0 |
| Fillers and Pigments | 80.0 |

Vinyl composition tile is highly filled and the primary filler is calcium carbonate, or crushed limestone. The ingredients are typically mixed in a high power, high shear, heated mixer, such as a Banbury Mixer, to combine and fuse them together into a heavy dough-like mass. This mass is then banded on a two roll mill and in the manufacture of grained or jaspe'd tile, accent colors, of the same or a similar composition material, may be added to the mill nip.

For the purposes of the present invention, however, the material can be sheeted and cooled, then cut into individual chips of regular or irregular dimension. An assortment of such chips prepared in suitable colors are then arranged in a metal frame and consolidated with heat and pressure into an aggomeration.

Alternatively, non-conductive chips and conductive chips, separately prepared, may be mechanically mixed, such as in a Baker Perkin mixer, and subsequently sheeted out as a mixed-chip conductive structure using a two-roll mill.

A factory finish may be applied to the hot consolidated aggomeration to enhance colors, provide uniform gloss, prevent blocking in storage and protect the product during installation. Such finishes, as well as wax finishes applied to conductive flooring in use have in the past acted to insulate flooring material unless such finishes and waxes were formulated to be conductive. For reasons which are as yet unexplained, such conductive finishes and waxes do not appear to be necessary with the products of the present invention as the products of the present invention appear to maintain their conductive properties even with the application of a limited amount of conventional finishes and waxes.

Vinyl composition tile is typically offered in several gauges and sizes depending on intended end use. For residential applications, vinyl composition tile is offered in so-called service gauge which is 1/16 inch thick.

For commercial markets, vinyl composition tile is typically offered in 3/32 inch and ⅛ inch gauges, the latter being most frequently specified for heavy traffic. The standard size of vinyl composition tile is 12 inches by 12 inches, although other sizes may be commercially available.

The performance requirements, outlined in Federal Specification SS-T-312b, include size, thickness, squareness, and dimensional stability tolerances. These factors are critically important in the finished appearance of the installed tile floor. Other characteristics contained in the specification are solvent resistance, indentation requirements, deflection, volatility, and impact resistance.

Vinyl composition tile is a fairly rigid material, and at room temperature will not bend acutely without breaking. However, if deflected very slowly, it will bend. This attribute is necessary to successfully install the material over normal subfloors that are not perfectly flat allowing it to conform to subfloor irregularities. Commercial installation of vinyl composition tile is usually done with a full spread of asphalt adhesive and the tile is set into the adhesive after the solvent has evaporated. Solventless adhesives are also available containing emulsified asphalt and resins for areas where solvent vapors are undesirable. Rubber latex adhesives also are used where black asphalt adhesives would be undesirable and for use over preexisting tile floors. Such adhesives are often available in conductive forms for us with the tile of the present invention.

Vinyl composition tile is generally considered the standard or base grade commercial finish flooring. It has the lowest relative installed cost and has per formed satisfactorily in commercial environments for many years. The major market segment for such tile use today is the mercantile market, where vinyl composition tile has been used almost exclusively for the general floor area of grocery stores, supermarkets, and discount department stores. It is also used extensively in schools, health care facilities and to a lesser extent in offices, banks, and light industries.

There is no minimum binder level requirement for Type IV (vinyl composition) tile, and this is the primary difference between vinyl composition tile and Type III vinyl tile or "solid" vinyl tile. The Federal Specification SS-T-312b requires that the minimum binder level of Type 111 tile shall not be less than 34%, and defines binder to include vinyl resin(s), plasticizers and stabilizers. Vinyl tile is considerably more flexible than vinyl composition tile, but it is also significantly more expensive, because of its higher binder level.

Until the present invention, static dissipative flooring of the vinyl composition tile type has not been commercially successful, chiefly because of moisture growth problems. Type III vinyl tile alternatives containing conductive material, however, have remained expensive alternatives.

There are two general classes of materials available which will dissipate static charges. The first class of these is referred to as "conductive" materials, and typically have resistivities in the range of $10^3$ to $10^6$ ohms/square. Charge dissipative materials, or static dissipative materials, the second class, typically have resistivities in the range of $10^6$ to $10^{11}$ ohms/square.

Static dissipative electrical properties as referred to herein, means that the resistivity of a material should be less than $10^{11}$ ohms/square. In addition, a material should have a charge decay rate, for 5000 volts to 0 volts, of no more than 2.0 seconds.

Type III vinyl flooring tiles are commercially available which incorporate carbon black or metallic materials. These tiles, because of the coloration of the high filler content, are not believed to be suitable for highly decorative floor tile applications. In addition, because of the cost of the conductive filler material, and the high binder level, such tiles tend to be expensive.

Vinyl composition flooring tiles have previously been known which have employed antistatic agents containing quaternary ammonium salt functionalties. However, these were flooring tiles of the kind known as "straight grain", in which the antistatic agent was substantially uniformly distributed. Such products, while they met the static dissipative electrical property requirements, defined above, demonstrated serious moisture growth problems which may have limited their usefulness in certain applications.

It has now been determined that a slightly modified construction of flooring tile, employing a compressed aggomeration of individual chips, can achieve the same or similar electrical properties without the moisture growth problems known to the prior art.

This has been accomplished, quite surprisingly, by limiting the presence of the antistatic agent to only a portion of the individual chips or minimizing the amount of the antistatic agent in a portion of the individual chips. As the examples which follow will demonstrate, static dissipative electrical properties are affected only slightly, while moisture growth properties fall dramatically as the proportion of individual chips containing a charge dissipating amount of antistat is reduced. While even a small reduction in the proportion of chips containing the typical level of antistat will serve the purposes of the present invention, it has been demonstrated that better results are obtained if the proportion of chips containing a charge dissipating amount of antistat represent between from about twenty-five (25%) to about eighty-five (85%) by weight of the overall composition. Still better results are obtained if the proportion of chips containing the charge dissipating amount of antistat represent between from about thirty-five percent (35%) and about seventy percent (70%) by weight of the overall composition.

Although it is assumed that other antistatic agents may be operable in the practice of the present invention, such agents containing quaternary ammonium salt functionalties have demonstrated static dissipative electrical properties in flooring tiles which meet other physical requirements. Such antistatic agents include Larostat 264A. commercially available from the Jordan Chemical company; Cyastat LS, commercially available from American Cyanamid; and Hexcel 106G, commercially available from the Hexcel Corporation.

As detailed in the Examples which follow, it has been found, surprisingly, that the charge dissipative tiles of the present invention may be maintained with minimal applications of commonly available commercial floor care products without significant loss of their charge dissipative characteristics. In fact, some data generated seems to indicate that an increase in such characteristics may be measured. Applicants do not propose any explanation for the increased conductivity of the normally insulative floor finishing material.

EXAMPLE 1

Vinyl composition tiles were prepared by mixing and consolidating vinyl composition material in chip form. Specifically, the vinyl composition material had the following formulation in parts by weight:

| | |
|---|---|
| Polyvinyl chloride resin | 121.00 |
| Hydrocarbon resin | 10.00 |
| Phthalic ester plasticizer | 40.50 |
| Stabilizer | 6.00 |
| Titanium dioxide (opacifier) | 7.80 |
| Crushed Limestone (40 mesh) | 815.00 |

To a portion of this material was added 1.5% of an antistatic agent, Larostat 264A, commercially available from the Jordan Chemical Company. After dicing both vinyl structures into chips with a dimension of about ¼ inches, floor tiles were prepared by mixing the chips in the proportions shown in Table 1 and filling a metal frame. The chips were subsequently hotpressed for ten (10) minutes at 310° F., at a pressure of 1000 pounds per square inch. Electrical properties and moisture growth characteristics for the resulting tiles are also given in Table 1.

EXAMPLE 3

A volume of vinyl composition tiles were prepared by separately mixing batches of materials having the compositions listed by weights in Table 3A in a Baker-Perkin mixer. Each batch had a temperature of between 280° F. to 2856° F. at the end of about fifteen (5) minutes of mixing. Mottle chips or accent colors prepared of the same compositions beforehand were added and mixing continued for approximately one minute at the same temperature.

Each mixed vinyl composition was then sheeted off in a mill to make a jaspe blanket. The front mill roll was adjusted to approximately 210° F. while the back roll was maintained between 250° F. and 270° F. The blanket was then die-cut into cubes or furnish.

After batches A through F were converted into cubes in this manner, they were blended and mixed in an equal ratio and transferred to a metal screen carrier. The mixed vinyl cubes were then carried through a chamber heated to between 330° F. and 350° F., to partially soften the vinyl cubes. The mixed and temperature conditioned cubes were then fed through a set of calender rolls equipped with an oscillating blade to consolidate the structure. The temperature of the top roll was maintained between 220° F. and 225° F., while the bottom roll was maintained at between 330° F. and 350° F.

TABLE 1

| Ratio of Chips Containing Antistat to Chips Not Containing Antistat | Surface Resistivity at 50% Relative Humidity | | Surface Resistivity at 15% Relative Humidity | | Charge Decay Rate at 13% Relative Humidity | Moisture Growth |
|---|---|---|---|---|---|---|
| | Tile Alone | Tile Mounted on a Plywood Board With a Conductive Adhesive | Tile Alone | Tile Mounted On a Plywood Board With a Conductive Adhesive | | |
| 100/0 | $1.8 \times 10^8$ ohm/sq | $8.7 \times 10^7$ ohm/sq | $8.7 \times 10^9$ ohm/sq | $3.7 \times 10^8$ ohm/sq | 0.01 sec. | 5.61% |
| 60/40 | $2.0 \times 10^8$ ohm/sq | $8.5 \times 10^7$ ohm/sq | $1.9 \times 10^9$ ohm/sq | $4.5 \times 10^8$ ohm/sq | 0.02 sec. | 1.25% |
| 50/50 | $4.0 \times 10^8$ ohm/sq | $1.0 \times 10^8$ ohm/sq | $8.9 \times 10^8$ ohm/sq | $6.5 \times 10^8$ ohm/sq | 0.02 sec. | 0.84% |
| 45/55 | $5.3 \times 10^8$ ohm/sq | $4.2 \times 10^8$ ohm/sq | $3.4 \times 10^9$ ohm/sq | $1.7 \times 10^9$ ohm/sq | 0.04 sec. | 0.66% |
| 40/60 | $5.7 \times 10^8$ ohm/sq | $3.2 \times 10^8$ ohm/sq | $3.0 \times 10^9$ ohm/sq | $6.5 \times 10^8$ ohm/sq | 0.03 sec. | 0.32% |
| 35/65 | $1.6 \times 10^9$ ohm/sq | $5.4 \times 10^8$ ohm/sq | $1.5 \times 10^{10}$ ohm/sq | $2.4 \times 10^9$ ohm/sq | 0.48 sec. | 0.16% |
| 0/100 | $5.0 \times 10^{13}$ ohm/sq | $1.5 \times 10^{13}$ ohm/sq | $6.0 \times 10^{13}$ ohm/sq | $3.0 \times 10^{13}$ ohm/sq | >6 sec. | 0.14% |

EXAMPLE 2

Vinyl composition tiles were prepared from the conductive and non-conductive chips prepared in Example 1. Such chips were combined in the proportions set out in Table II, mechanically mixed in a Baker Perkin mixer, and subsequently sheeted out using a two-roll mill and cut into tiles. As shown in Table II, the vinyl composition tiles prepared in this manner possessed electrical dissipative properties and mechanical properties similar to the tiles of Example 1.

After this consolidation step, the blanket was reheated and fed into a consolidator to effect the final guage reduction and facing operation before being punched into twelve inch by twelve inch (12"×12") one-eighth inch (⅛) thick tiles.

The tile produced in this manner met the indentation, impact resistance, deflection and volatility requirements of Federal Specification SS-T-312B for Type IV vinyl composition tile. Dimensional properties did not meet specification requirements, but it was believed that processing adjustments would overcome this problem. The tiles also demonstrated excellent electrical charge dissipating characteristIcs, as shown in Table 3B.

TABLE 2

| Ratio of Chips Containing Antistat to Chips Not Containing Antistat | Surface Resistivity at 50% Relative Humidity | | Surface Resistivity at 15% Relative Humidity | | Charge Decay Rate at 13% Relative Humidity | Moisture Growth |
|---|---|---|---|---|---|---|
| | Tile Alone | Tile Mounted on a Plywood Board With a Conductive Adhesive | Tile Alone | Tile Mounted On a Plywood Board With a Conductive Adhesive | | |
| 0/100 | $>10^{13}$ ohm/sq | $>10^{13}$ ohm/sq | $>10^{13}$ ohm/sq | $>10^{13}$ ohm/sq | >10 sec. | 0.43% |
| 50/50 cubes | $2.0 \times 10^8$ ohm/sq | $8.5 \times 10^7$ ohm/sq | $1.9 \times 10^9$ ohm/sq | $4.5 \times 10^8$ ohm/sq | 0.12 sec. | 2.4% |
| 40/60 cubes | $4.0 \times 10^8$ ohm/sq | $1.0 \times 10^8$ ohm/sq | $8.9 \times 10^8$ ohm/sq | $6.5 \times 10^8$ ohm/sq | 0.28 sec. | 2.0% |
| 35/65 cubes | $5.3 \times 10^8$ ohm/sq | $4.2 \times 10^8$ ohm/sq | $3.4 \times 10^9$ ohm/sq | $1.7 \times 10^9$ ohm/sq | 0.61 sec. | 1.85% |
| 50/50 chips | $5.7 \times 10^8$ ohm/sq | $3.2 \times 10^8$ ohm/sq | $3.0 \times 10^9$ ohm/sq | $6.5 \times 10^8$ ohm/sq | 0.05 sec. | 1.5% |
| 40/60 chips | $1.6 \times 10^9$ ohm/sq | $5.4 \times 10^8$ ohm/sq | $1.5 \times 10^{10}$ ohm/sq | $2.4 \times 10^9$ ohm/sq | 0.08 sec. | 1.2% |

TABLE 3A

| | Product Formulations (%) | | | | | |
|---|---|---|---|---|---|---|
| | A | B | C | D | E | F |
| Limestone | 80.35 | 81.05 | 80.75 | 78.60 | 79.25 | 78.93 |
| Pigments | 2.00 | 1.30 | 1.60 | 1.95 | 1.30 | 1.62 |
| Antistat (Larostat 264-A) | 0.00 | 0.00 | 0.00 | 1.60 | 1.60 | 1.60 |
| Vinyl Resin | 11.45 | 11.45 | 11.45 | 12.65 | 12.65 | 12.65 |
| Hydrocarbon Resin | 1.15 | 1.15 | 1.15 | 1.15 | 1.15 | 1.15 |
| Plasticizer | 4.40 | 4.40 | 4.40 | 3.40 | 3.40 | 3.40 |
| Stabilizer | 0.65 | 0.65 | 0.65 | 0.65 | 0.65 | 0.65 |

TABLE 3B

| Surface Resistivity | | |
|---|---|---|
| Relative Humidity (%) | Tile Alone (ohms/sq.) | Tile with Conductive Adhesive (ohms/sq.) |
| 50 | 6 to 9 × $10^8$ | 2 to 4 × $10^8$ |
| 15 | 4 to 7 × $10^9$ | 5 to 8 × $10^8$ |

| NFPA 99 Resistance |
|---|
| 2 to 10 × $10^6$ ohms (measured with Meggameter) |

| Static Decay Rate | |
|---|---|
| (5000 Volts to 0 Volts at 15% Relative Humidity | |
| Tile Alone | 0.06 to 0.08 seconds |
| Tile with Conductive Adhesive | 0.01 to 0.02 seconds |

| Triboelectric Charging |
|---|
| Measured at 50% Relative Humidity with a NASA Rubbing Wheel Tribocharge Test Apparatus) 2000 to 4000 Volts |

EXAMPLE 4

This example compares the use of commercial conductive floor polish in maintaining commercially available carbon-veined conductive floor tile and the charge dissipative tile of this invention as prepared in Example 3. In this example, nine (9) 12"×12"tiles selected from each of commercial carbon-veined tiles, charge dissipative tiles of Example 3 and commercially-available vinyl composition tiles were installed in a contiguous side by side array in a hallway over a cement substrate floor base. A commercially-available carbon filled latex-base conductive adhesive, measured to have a surface resistivity of 4×$10^5$ ohms/square, was used for the installation. After cleaning the tiles with detergent and clean water to clear dirt from the tile surface, four coats of a commercially-available conductive floor polish were applied to the tiles following ordinary and typical floor polish application procedures. The surface resistivities of the coated floor tiles were monitored periodically after the conductive floor wax was applied and the results of these measurements are reported in Table 4. The resistivity measurements were done in accordance with the ASTM D-257 method using a concentric ring electrode, the Ike Probe from the Electro-tech System Inc., and a Dr. Thiedig Milli-TO multi range resistivity meter for registering the read out. As shown in the table, the initial conductivity, which is the inverse of the resistivity, of the coated carbon-veined conductive tile is about the same in magnitude as the non-conductive vinyl composition tile. For the charge dissipative tiles, however, the conductive floor polish shows a synergistic effect in conductivity yielding a conductivity higher than that of the untreated charge dissipative tiles or the vinyl tile with conductive floor wax. It should be noted further that the conductivity of the treated charge dissipative tiles was measured to be higher than the conductivity measured for either treated or non-treated carbon-veined tiles.

After one week with traffic, the conductive floor wax appeared to partially wear off, as indicated by the loss in conductivity of the treated vinyl tiles, but the treated charge dissipative tiles still showed higher conductivity then the non-treated charge dissipative tile samples. The treated carbon-veined tiles, on the other hand, shows a much greater loss in conductivity. In this case, the conductivity of the conductive polish treated carbon-veined tiles was measured to be about one order of magnitude lower than the conductivity of non-treated carbon-veined tiles.

After two weeks of traffic and wear, the conductive polish appeared to wear off further, and the conductivity of the treated vinyl tile was further reduced. While the conductivity of the treated carbon-veined tiles were still lower than the conductivity of the untreated carbon-veined tiles, no loss in conductivities were measured in the non-treated and treated charge dissipative tiles of the present invention.

EXAMPLE 5

This example demonstrates the effects of using a non-conductive floor polish in the maintenance of charge dissipative floor tiles. The charge dissipative tile samples installed on a cement base substrate described in Example 4 were stripped and cleaned following ordinary floor maintenance procedures. One coat of a floor finish coating (a commercial acrylic base floor polish material) was applied to a portion of the charge dissipative tile samples. The surface resistivities of treated and non-treated charge dissipative tiles were monitored in a similar fashion as described in Example 4. No loss in conductivity was found between the treated and non-treated charge dissipative tile samples as shown in Table 5. The treated charge dissipative tiles, however, demonstrated superior resistance to dirt pickup when compared to the non-treated charge dissipative tiles.

EXAMPLE 6

When a floor polish is used in maintaining conductive floor tiles in an ESD protected area, it requires that the polish should not interfere with the charge dissipating efficiency of the tile and that the triboelectric charge generation should be no greater than the generation of the tile alone. In this example, the triboelectric charging of untreated charge dissipative tile and charge dissipative tile coated with a commercial acrylic floor polish were compared. The measurement of triboelectric charging was done in accordance with the AATCC Test Method 134–1979 (Electrostatic propensity of Carpets, AATCC Test Method 134–1979, American Association of Textile Chemist and Colorists, Research Triangle Park, N.C., revised 1979), commonly known as the "step test". Four different types of shoe sole materials were used in this test, they include neoprene A, neoprene B, leather and neolite. Table 6 summarizes the charge generation measured at different humidities. As shown, the triboelectric charges generated from the untreated charge dissipative tile and the charge dissipative tile treated with one coat of a commercial acrylic floor polish are about the same.

TABLE 4

|  | One Day After Treatment (ohms per square at 55% Relative Humidity) | Seven Days After Treatment (ohms per square at 45% Relative Humidity) | Fourteen Days After Treatment (ohms per square at 52% Relative Humidity) |
| --- | --- | --- | --- |
| Charge Dissipative Tile | $4.5 \times 10^7$ | $8.5 \times 10^7$ | $4.0 \times 10^7$ |
| Charge Dissipative Tile with Conductive Polish | $7.5 \times 10^6$ | $3.0 \times 10^7$ | $1.5 \times 10^7$ |
| Commercial Carbon-Veined Conductive Tile | $3.6 \times 10^7$ | $3.0 \times 10^7$ | $1.5 \times 10^7$ |
| Commercial Carbon-Veined Conductive Tile with Conductive Polish | $4.2 \times 10^7$ | $5.0 \times 10^8$ | $5.5 \times 10^8$ |
| Commerical PVC Tile | $> 10^{15}$ | $> 10^{15}$ | $> 10^{15}$ |
| Commercial PVC Tile with Conductive Polish | $4.2 \times 10^7$ | $2.10 \times 10^9$ | $1.9 \times 10^{10}$ |

TABLE 5

|  | One Day After Treatment (ohms per square at 55% Relative Humidity) | Seven Days After Treatment (ohms per square at 45% Relative Humidity) | Fourteen Days After Treatment (ohms per square at 52% Relative Humidity) |
| --- | --- | --- | --- |
| Charge Dissipative Tile | $4.5 \times 10^7$ | $8.5 \times 10^7$ | $4.0 \times 10^7$ |
| Charge Dissipative Tile with Commerical Non-Conductive Polish | $4.2 \times 10^7$ | $9.0 \times 10^7$ | $4.6 \times 10^7$ |

TABLE 6

|  | Neoprene A | Neoprene B | Leather | Neolite |
| --- | --- | --- | --- | --- |
| | Triboelectric Charge (Volts at 33% Relative Humidity) | | | |
| Commercial PVC Tile | 2010 | 870 | 3100 | 5050 |
| Commercial PVC Tile with Commercial Non-Conductive Polish | 600 | 340 | 980 | 2030 |
| Charge Dissipative Tile | 30 | 141 | 64 | 298 |
| Charge Dissipative Tile with Commercial Non-Conductive Polish | 32 | −100 | 50 | −194 |
| | Triboelectric Charge (Volts at 50% Relative Humidity) | | | |
| Commercial PVC Tile | 460 | — | 949 | 2060 |
| Charge Dissipative Tile | 3 | −24 | 6 | −7 |
| Charge Dissipative Tile with Commercial Non-Conductive Polish | −10 | −36 | −15 | −72 |

EXAMPLE 7

To avoid waste, improve consolidation and improve processing in the manufacture of floor tiles, it is standard practice to recycle the punch frame scrap into the vinyl composition tile batch in the form of a remix. Of course, since the punch frame scrap includes some antistatic agent, this recycling of the remix introduces a low level of antistatic agent throughout any composition in which the remix is added.

In this example, the remix was added to both of the fresh or virgin compositions, the first including antistatic agent and the second including no antistatic agent. Note that since the mottle which contains no antistatic agent is added at the end of the mixing step to break up the base batch of mixed virgin and remix compositions to improve feeding of the tile composition through the mill chute, the mottle composition is not intimately mixed and the tile compositions includes mottle areas which do not contain an antistatic agent.

The tile sample was made by preparing chips 50% of which contained antistatic agent and 50% of which did not contain antistatic agent. The formulations are set forth below in parts by weight.

|  | With Antistat | Without Antistat |
| --- | --- | --- |
| Base Material | | |
| Virgin Formulation | | |
| Polyvinyl chloride resin | 336.0 | 303.0 |
| Alpha methyl styrene tackifier | 24.0 | 24.0 |
| Phthalic ester plasticizer | 49.4 | 99.0 |
| Stabilizer | 14.4 | 14.4 |
| Titanium dioxide opacifier | 130.7 | 98.8 |
| Crushed limestone | 1790.2 | 1860.8 |
| Antistat-Larostat 264A | 55.3 | — |
|  | 2400.0 | 2400.0 |
| Remix | 600.0 | 600.0 |
| Mottle | 780.0 | 780.0 |
|  | 3780.0 | 3780.0 |

Two mottles were prepared at a thickness of 100 mils with two different pigmentations. The formulation in parts by weight for the mottles were:

| Polyvinyl chloride resin | 83.6 |
| --- | --- |
| Alpha methyl styrene tackifier | 14.2 |
| Phthalic ester plasticizer | 30.2 |
| Stabilizer | 6.6 |
| Titanium dioxide opacifier | 22.4 |
| Crushed limestone | 623.0 |
|  | 780.0 |

Each mottle has premixed in an Eirich mixer for about three minutes, brought to a temperature of about 340° F. to about 370° F. in a Farrel mixer in about 30 seconds, and sheeted off a two roll mill to a thickness of about 100 mils. The sheet was ground into chips having a minimum dimension of about ¼ inch to about ¾ inch.

The virgin formulation was charged into a Type F mixer with remix. The remix was formed by grinding punch frame scrap and reject tiles into about ¼ inch chips. The virgin formulation and remix were mixed in the presence of heat in a Type F mixer for about 17 minutes. The mottle was then added and the mixing continued for about two minutes. The antistatic and nonantistatic vinyl composition of mottle and base material were sheeted off a mill and diced into chips. The chips were then blended in a 50/50 ratio and reconsolidated under heat and pressure in a tile line calendar to make the finished static dissipative tile.

The moisture growth of the finished tile was 0.6% with acceptable electrical properties. See Table 7 following Example 8 At equilibrium the percent antistatic agent is as follows:

|  | With Antistat | Without Antistat |
|---|---|---|
| Virgin | 2.3% | 0% |
| Remix | 0.87% | 0.87% |
| Base | 2.02% | 0.17% |
| Mottle | 0% | 0% |

Since the mottle is not homogeneously distributed within the tile chips, there are regions (approximately 20%) of the chip without anY antistatic agent. About 40% of the chip has 2.0% antistatic agent and about 40% of the chip has 0.17% antistatic agent.

EXAMPLE 8

To simplify the manufacturing process and reduce the chance of errors, the above described process was modified to introduce the antistatic agent only in the mottle. Since the base material of intimately mixed virgin and remix formulations include antistatic agent from the remix, some antistatic agent is distributed throughout the tile composition. However, the concentration of antistatic agent in the base material is not high enough to contribute substantially to the moisture growth problem or have the desired static dissipative properties. Such a level of antistatic agent is deemed to be an insubstantial amount. Preferably the amount of antistatic agent in the base material is less than 0.25% and less than one tenth of the antistatic composition in the mottle.

The antistatic mottle composition was prepared by premixing the following formulation (in parts by weight) in an Eirich mixer for about six minutes.

| Antistatic Mottle | |
|---|---|
| Polyvinyl chloride resin | 242.0 |
| Alpha methyl styrene tackifier | 20.0 |
| Phthalic ester plasticizer | 48.0 |
| Stabilizer | 17.2 |
| Titanium dioxide opacifier | 21.4 |
| Crushed limestone | 1612.4 |
| Larostat 264A antistatic agent | 39.0 |
| | 2000.0 |

The mottle composition was then brought up to about 340° F. to 370° F. in a Farrel mixer in about 30 seconds. The mixed composition was then sheeted off a two roll mill to a thickness of about 100 mils and ground into chips.

It is surprising and unexpected that the antistatic agent containing mottle can be fused in a Farrel mixer. One would expect the antistatic agent to be destroyed at the temperatures reached in the high intensity Farrel mixer. However, the antistatic agent is subjected to the high intensity mixing for only a brief time.

The fresh or virgin composition had the following formulation in parts by weight:

| Virgin Composition | |
|---|---|
| Polyvinyl chloride resin | 70.0 |
| Alpha methyl styrene tackifier | 5.6 |
| Phthalic ester plasticizer | 23.5 |
| Stabilizer | 3.4 |
| Titanium dioxide opacifier | 6.0 |
| Crushed limestone | 451.5 |
| | 560.0 |

The virgin composition and remix were processed in a manner similar to Example 7. Two tests were run, the first with 40% mottle and the second with 33.3% mottle. The following pounds of the components were charged into Type F mixers. The percent of the tile composition is indicated in the parenthesis.

|  | Test 1 | Test 2 |
|---|---|---|
| Remix | 160 (11.9%) | 240 (20%) |
| Virgin | 640 (47.4%) | 560 (46.7%) |

After mixing for about 17 minutes 550 lbs. (40.7%) mottle was added in Test I and 400 (33.3%) mottle was added in Test 2. After addition of the mottle, mixing was continued for about two minutes. The tile composition was then sheeted, diced into about ¼ inch cubes, and reconsolidated under heat and pressure using an oscillating blade in a calendar nip.

If the mottle and base material are different colors or shades, a straight grain or, mottled or jaspe sheet is produced. By blending cubes of different colors before the reconsolidation, a wide variety of pattern coloration and design can be achieved.

The surface resistivity of tiles made by the processes of Examples 7 and 8 were as follows:

TABLE 7

| Relative Humidity (%) | Surface Resistivity | | |
|---|---|---|---|
| | Example 7 (ohms/sq) | Example 8 (40% mottle) (ohms/sq) | Example 8 (33.3% mottle) (ohms/sq) |
| 50 | $1.6 \times 10^9$ | $1.6 \times 10^9$ | $1.3 \times 10^9$ |
| 15 | $8.5 \times 10^{10}$ | $4.9 \times 10^{10}$ | $5.6 \times 10^{10}$ |

What is claimed is:

1. A surface covering product having static dissipative electrical properties comprising a composition of a consolidated agglomeration of individual chips of polymeric material wherein a first portion of said individual chips are electrically conductive and a second portion of said individual chips are electrically non-conductive.

2. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, the first portion representing between about twenty-five percent (25%) and about eight-five percent (85%) by weight of the overall composition.

3. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, said first portion containing between about one quarter of one percent and about five percent by weight of the antistatic agent.

4. The surface covering product of claim 3 wherein the first portion contains between about one percent and about two percent by weight of the antistatic agent.

5. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, said antistatic agent having quaternary ammonium salt functionalities.

6. The surface covering product of claim 5, wherein the antistatic agent is mixed in the first portion with a high intensity mixer.

7. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, said second portion containing less than one quarter of one percent by weight of antistatic agent.

8. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, the percentage of antistatic agent in the second portion being no more than one tenth the percentage of antistatic agent in the first portion.

9. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, the antistatic agent in said second portion being the result of introducing scrap material from a previous manufacturing run into the starting material of said second portion, said starting material containing substantially no antistatic agent.

10. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, said antistatic agent in the second portion being substantially uniformly distributed within each individual chip of the second portion.

11. The surface covering product of claim 1 wherein the individual chips of the first and second portions are substantially uniformly distributed within the upper exposed layer of the surface covering.

12. A surface covering product having static dissipative electrical properties comprising a composition of a consolidated agglomeration of individual chips of polymeric material wherein a first portion of said individual chips contain a substantial amount of an antistatic agent, a second portion of said individual chips contain only an insubstantial amount of antistatic agent and a third portion of individual chips which contain no antistatic agent.

13. A surface covering product having static dissipative electrical properties comprising a composition of a consolidated agglomeration of individual chips of polymeric material wherein a first portion of said individual chips contain a substantial amount of an antistatic agent and a second portion of said individual chips contain only an insubstantial amount of antistatic agent, said second portion of the individual chips having a resistivity of greater than $10^{11}$ ohms/sq.

* * * * *